United States Patent
Fabien

(10) Patent No.: US 12,551,627 B2
(45) Date of Patent: *Feb. 17, 2026

(54) AUTO-INJECTOR

(71) Applicant: APTAR FRANCE SAS, Le Neubourg (FR)

(72) Inventor: David Fabien, Corseul (FR)

(73) Assignee: APTAR FRANCE SAS, Le Neubourg (FR)

(*) Notice: Subject to any disclaimer, the term of this patent is extended or adjusted under 35 U.S.C. 154(b) by 1207 days.

This patent is subject to a terminal disclaimer.

(21) Appl. No.: 17/277,376

(22) PCT Filed: Sep. 19, 2019

(86) PCT No.: PCT/FR2019/052194
§ 371 (c)(1),
(2) Date: Mar. 18, 2021

(87) PCT Pub. No.: WO2020/058640
PCT Pub. Date: Mar. 26, 2020

(65) Prior Publication Data
US 2022/0031951 A1    Feb. 3, 2022

(30) Foreign Application Priority Data

Sep. 20, 2018 (FR) ..................... 1858539

(51) Int. Cl.
*A61M 5/20* (2006.01)
*A61M 5/24* (2006.01)
(Continued)

(52) U.S. Cl.
CPC ...... *A61M 5/31501* (2013.01); *A61M 5/2033* (2013.01); *A61M 5/2422* (2013.01);
(Continued)

(58) Field of Classification Search
CPC ...... A61M 5/31501; A61M 2005/2013; A61M 5/31593; A61M 5/2033; A61M 5/2422;
(Continued)

(56) References Cited

U.S. PATENT DOCUMENTS 6,599,272 B1 * 7/2003 Hjertman .......... A61M 5/31581
604/209
8,652,100 B1 * 2/2014 Cowe .................. A61M 5/2033
604/117
(Continued)

FOREIGN PATENT DOCUMENTS

WO   2004/024218 A1   3/2004
WO   2009/098502 A2   8/2009
(Continued)

OTHER PUBLICATIONS

International Search Report of PCT/FR2019/052194 dated Jan. 24, 2020 [PCT/ISA/210].
(Continued)

*Primary Examiner* — Michael J Tsai
*Assistant Examiner* — William R Frehe
(74) *Attorney, Agent, or Firm* — Sughrue Mion, PLLC

(57) ABSTRACT

An autoinjector having a reservoir (110); a piston (111); a needle (112); a driver module having a body (201); a piston rod (210) movable between rest position and injection positions; an injection spring (220); and a lock that blocks the piston rod in its rest position. The lock ha a thread (230) connected to the piston rod and to a toothed winder wheel (240), a locking member (260) co-operating with a tooth (241) of the toothed winder wheel, the locking member (260) movable between a blocking position preventing the winder wheel from turning in the direction of actuation force (Fa) exerted by the injection spring, and an actuated position allowing turning of the winder wheel. The autoinjector
(Continued)

includes a re-cocking mechanism (400) for rewinding the thread on the winder wheel by turning the winder wheel in the opposite direction to its direction during the injection stage.

7 Claims, 7 Drawing Sheets

(51) Int. Cl.
*A61M 5/315* (2006.01)
*A61M 5/32* (2006.01)
(52) U.S. Cl.
CPC ...... *A61M 5/31581* (2013.01); *A61M 5/3204* (2013.01); *A61M 2005/2013* (2013.01); *A61M 2005/202* (2013.01); *A61M 2005/206* (2013.01); *A61M 2005/31508* (2013.01)
(58) Field of Classification Search
CPC ............ A61M 5/31581; A61M 5/3204; A61M 2005/202; A61M 2005/206; A61M 2005/31508; A61M 5/321; A61M 5/3243; A61M 5/3245; A61M 2005/3247; A61M 2005/3252; A61M 5/3257; A61M 5/326; A61M 2005/3267

USPC ........................................................ 604/197
See application file for complete search history.

(56) References Cited

U.S. PATENT DOCUMENTS

| 12,171,987 | B2* | 12/2024 | Fabien | A61M 5/2422 |
| 2005/0197625 | A1* | 9/2005 | Haueter | A61M 5/1454 |
| | | | | 604/131 |
| 2016/0325052 | A1* | 11/2016 | Spork | A61M 5/3245 |

FOREIGN PATENT DOCUMENTS

| WO | 2010/112377 A1 | 10/2010 |
| WO | 2014/036239 A2 | 3/2014 |
| WO | 2016/193622 A1 | 12/2016 |
| WO | 2018/136717 A1 | 7/2018 |

OTHER PUBLICATIONS

International Preliminary Report on Patentability issued Nov. 13, 2020 in International Application No. PCT/FR2019/052194.

* cited by examiner

AUTO-INJECTOR

CROSS REFERENCE TO RELATED APPLICATIONS

This application is a National Stage of International Application No. PCT/FR2019/052194 filed on Sep. 19, 2019, claiming priority based on French Patent Application No. 1858539 filed on Sep. 20, 2018.

The present invention relates to an autoinjector.

Autoinjectors are well known in the prior art. The purpose of such devices is mainly to inject the contents of a syringe or of a cartridge automatically into a patient's body. Various systems exist for making the injection of the fluid contained in the syringe automatic. Autoinjectors are relatively complex devices that must satisfy a certain number of constraint requirements in order to be reliable. The robustness of the device, its handling, and its ease of use for the user are also important elements. In addition, the cost of manufacture and of assembly is also a factor that needs to be taken into account.

Numerous autoinjectors exist on the market that may present drawbacks.

Thus, autoinjectors generally use one or more springs, held cocked before triggering, so as to perform injection proper, and sometimes also jabbing. The springs may be of any type, in particular traction, compression, torsion, spiral, or others. In most circumstances, the force generated by the spring and available for thrusting the piston during expulsion of the fluid is associated directly with the force/length characteristics or other dimensional parameters of the spring, such as angle for a torsion spring. The injection spring then exerts a maximum force at the beginning, with this force progressively decreasing during the injection stage. This may in particular present problems depending on the viscosity of the fluid to be dispensed. Furthermore, the spring should present thrust that is large at the beginning of injection, so as to guarantee that the injection stage is performed in full, which can make the beginning of the injection stage painful.

Ideally, it should in fact be possible to modulate the force applied by the spring(s) of the autoinjector on the piston rod during the actuation stroke in order to adapt to the various steps encountered by the piston during expulsion. Thus, while docking the piston rod on the piston, it is necessary to avoid an impact that is too violent, in order to avoid damaging or breaking the reservoir, in particular the collar for a syringe. In contrast, storage can lead to a phenomenon of the piston jamming in the reservoir, and this requires a spike of force to initiate movement of the piston. In addition, as a result of their characteristics, certain fluids may require force to vary during expulsion. Mention may thus be made of non-Newtonian fluids that have the distinctive feature of having viscosity that depends on the speed of the molecules. Thus, during the first millimeters of the stroke of the piston, a spike of force is necessary in order to initiate the movement of the piston. Furthermore, certain very viscous fluids require a large force to be applied on the piston, typically lying in the range about 100 newtons (N) to about 200 N. However, the force required to trigger this very large expulsion force must remain acceptable for the user, and typically lie in the range about 4 N to about 8 N On another topic, a critical point of present-day autoinjectors, which are generally single-use autoinjectors, is that their main function, namely to dispense fluid, cannot be tested beforehand, prior to use by the final user.

Another problem arises with certain autoinjectors, in particular with autoinjectors that are for single-use and are thus disposed of after use. Unfortunately, such a complex device comprises numerous parts, and in particular metal parts, such as springs, and this poses recycling problems. Specifically, it is potentially difficult to recycle the metal of an autoinjector since it is subject to clinical waste regulations (DASRI in French legislation).

Documents WO 2004/024218, WO 2010/112377, WO 2016/193622, WO 2009/098502, WO 2018/136717, and WO 2014/036239 describe prior-art devices.

An object of the present invention is to provide an autoinjector that does not have the above-mentioned drawbacks.

Another object of the present invention is to provide an autoinjector with a predetermined force profile throughout the injection stage.

Another object of the present invention is to provide an autoinjector having a major portion that is reusable, with a portion that is disposable after each actuation that does not contain metal.

Another object of the present invention is to provide an autoinjector that the manufacturer can test before putting into the hands of the user.

Another object of the present invention is to provide an autoinjector that is reliable and safe in use, that makes it possible to guarantee that all of the fluid is dispensed to the desired location, and that is simple and inexpensive to manufacture and to assemble.

The present invention thus provides an autoinjector comprising:
- a reservoir module comprising a reservoir containing fluid and a piston, and including a needle; and
- a driver module comprising:
  - a body;
  - a piston rod that is adapted to co-operate with the piston of said reservoir, said piston rod being movable between a rest position and an injection position in which said piston rod has moved the piston of the reservoir so as to inject the fluid through said needle;
  - an injection spring for urging said piston rod towards its injection position; and
  - a lock that blocks said piston rod in its rest position, said lock comprising a thread that is connected at one end to said piston rod and at its other end to a toothed winder wheel, a locking member co-operating with a tooth of said toothed winder wheel, said locking member being movable, in particular pivotable, between a blocking position in which it prevents the winder wheel from turning in the direction of the actuation force exerted by said injection spring on said piston rod, and an actuated position in which said turning of the winder wheel is possible;
  said autoinjector including re-cocking means, such as a knob, for rewinding said thread on said winder wheel by turning said winder wheel in the opposite direction to its direction during the injection stage.

Advantageously, said reservoir module further comprises an actuator sleeve that is movable relative to said reservoir between a deployed position in which it is arranged around said needle, and an actuated position in which it is moved axially relative to the reservoir so as to expose the needle.

Advantageously, said autoinjector further comprises an interface module that is fastened to the driver module and that receives a reservoir module before each actuation.

Advantageously, said interface module comprises a selector ring that is mounted to turn on the driver module, and pivot elements for fastening the reservoir module in the interface module.

Advantageously, said selector ring is movable in turning between a locked position in which insertion of a reservoir module is possible and actuation of the driver module is not possible, an injection position in which actuation of the driver module is possible, a safety position in which an actuator sleeve of the reservoir module returns into its deployed position around said needle, and an ejection position in which ejection of the used reservoir module is possible.

Advantageously, said driver module includes force control means, for causing the force exerted by said injection spring on said piston rod to vary in predetermined manner throughout the injection stage, said force control means comprising a lever and a cam, said lever being pivotally mounted at one end on said piston rod, being connected to said injection spring, and co-operating at its other end with said cam.

Advantageously, a deflector wheel forming a pulley for the thread is provided between said piston rod and said winder wheel.

Advantageously, said locking member includes an extension that is adapted to co-operate with an actuator sleeve of the reservoir module when said needle has jabbed the site that is to be injected, so as to move said locking member towards its actuated position.

These and other characteristics and advantages appear more clearly from the following detailed description, given by way of non-limiting example, and with reference to the accompanying drawings, in which.

Figure 1:
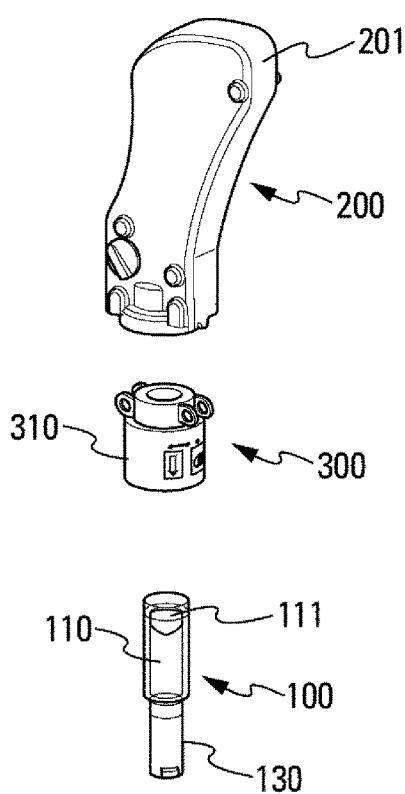
FIG. 1 is an exploded diagrammatic side view in perspective of the three modules of an autoinjector, in an advantageous embodiment.

The autoinjector is described below with reference to several advantageous embodiments. It should nevertheless be observed that autoinjectors, which are complex appliances, comprise a plurality of modules for performing a plurality of functions. The various modules may be used separately and independently of one another, without necessarily being combined with the other modules, and in particular they could be used in autoinjectors of shapes that are different from the shape shown in the drawings. Furthermore, it should be observed that the drawings are diagrammatic views, which do not necessarily represent the exact shape of the components of an autoinjector, and they are not necessarily to scale, in particular for purposes of clarity. In addition, the drawings do not necessarily represent all of the component elements of an autoinjector, but only the elements necessary for operation of the present invention. Thus, various additional and/or complementary elements and modules could be associated with the autoinjector shown in the figures.

In the embodiment shown in the drawings, the autoinjector comprises three distinct portions or modules: a reservoir module 100, a driver module 200, and an interface module 300.

FIG. 1 shows the three separate modules, and FIGS. 2 to 12 show the full reservoir module being put into place, the driver module being actuated, and the empty reservoir module being removed after actuation.

The reservoir module 100 comprises a reservoir 110 that contains fluid to be injected, a piston 111, and a needle 112. The piston 111 is adapted to move in said reservoir 110 so as to inject the fluid through said needle 112. More generally, it should be understood that the term "reservoir" in the present description encompasses any type of container associated with a needle, such as a syringe or a cartridge. The needle 112 may be fastened in permanent manner to said reservoir 110 or, in a variant, the needle 112 may be put into place on the reservoir 110 before the autoinjector is actuated.

In the embodiments described in the figures, the reservoir 110 is a cartridge, preferably made of glass.

The reservoir module 100 comprises the fewest possible parts, since it is disposable, and preferably does not include a spring or any other metal part.

The reservoir module 100 advantageously includes an actuator sleeve 120 having an axial end surface that is in contact with the site that is to be injected, and includes an opening through which the needle 112 passes during the jabbing stage. After actuation, the actuator sleeve 120 preferably covers the needle 112 of the reservoir so as to avoid any risk of pricking with said needle. The actuator sleeve 120 is adapted to slide relative to said reservoir 110 between a deployed position in which it is arranged around said needle 112, and an actuated position in which it is moved axially relative to the reservoir 110 so as to expose the needle 112.

When the reservoir 110 includes a needle 112, the reservoir module 100 may include a needle-protecting cap 130 that can be removed before using the autoinjector, advantageously by means of an appropriate removal member 135.

The driver module 200 contains the injection means and is preferably reusable. In order to be actuated, it may be associated with the interface module 300, since injection is advantageously triggered by said interface module. The driver module 200 serves to cause the actuation force Fa exerted on the piston rod to vary in predetermined manner during the injection stage, as explained in greater detail below.

The driver module 200 includes a body 201 that is advantageously made up of two hollow shells that are fastened to each other. The body contains a piston rod 210 that comes into contact with the piston 111 of the reservoir 110 during actuation and moves it axially in the reservoir 110 so as to inject the fluid. The piston rod 210 is advantageously guided axially in an appropriate guide profile of the body 201, e.g. such as a rail, a groove, or a centering part through which said piston rod 210 passes.

The body 201 of the driver module 200 also contains the injection and re-cocking means that are described in greater detail below.

The interface module 300 serves to connect the driver module 200 to the reservoir module 100. It is likewise preferably reusable. The interface module 300 serves firstly to insert the reservoir module 100. When the reservoir 110 is a cartridge, as in the examples in the figures, the interface module 300 also serves to screw on the needle sub-assembly and to remove the needle-protecting cap 130. Advantageously, such screw-fastening of the needle and/or such removal of the cap is/are possible only once the reservoir module 100 has been put into place on the interface module 300. The interface module also serves both to move the actuator sleeve 120 at the beginning of actuation so as to perform jabbing and trigger the injection stage, and also to lock it in the needle safety position after injection. Finally, it also serves to remove the empty reservoir module 100 for replacing with a new reservoir module 100 that is full.

The interface module 300 advantageously comprises both a selector ring 310 that is mounted to turn relative to the driver module 200, and also pivot elements 320.

Figure 2:
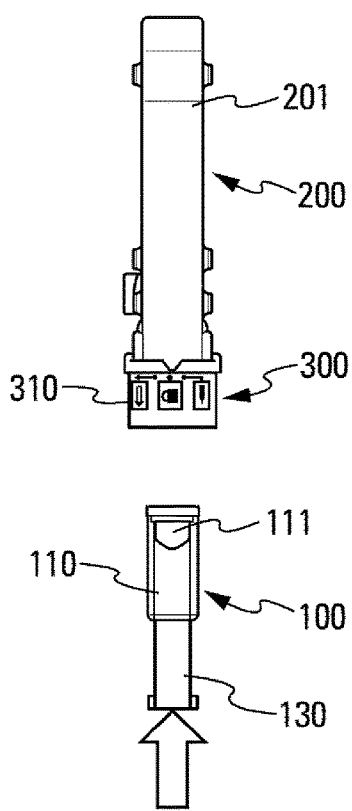
FIG. 2 is a diagrammatic side view in perspective of the FIG. 1 device as seen from another view point, shown with the interface module in place on the driver module, and before the reservoir module has been put into place.

In the position in FIG. 2, the interface module 300 is in place on the driver module 200. In this example, before the reservoir module 100 is in place, the selector ring 310 is in its locked position in which insertion of the reservoir module 100 is possible and actuation of the driver module 200 is not possible.

Figure 3:
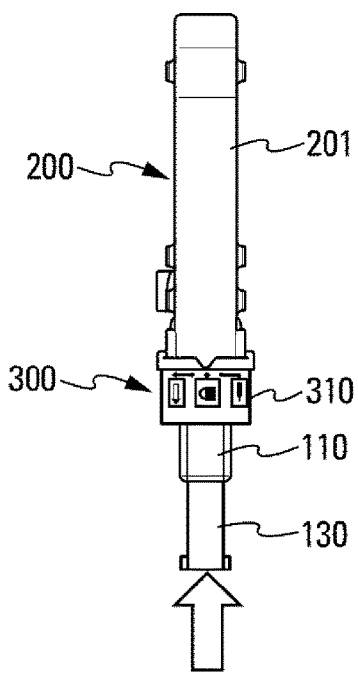
FIG. 3 is a view similar to the view in FIG. 2, shown after the reservoir module has been put into place.

The user may insert an unused reservoir module 100 into the interface module 300, as shown in FIGS. 2 and 3. Advantageously, it is not possible to insert a used reservoir module, e.g. as a result of a keying system. Optionally, a click sound can be heard when the reservoir module 100 gets into place.

Figure 4:
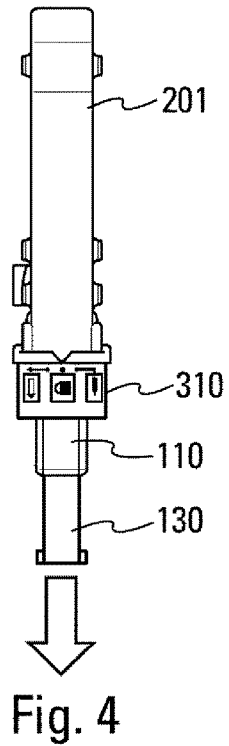
FIG. 4 is a view similar to the view in FIG. 3, shown before the needle-protecting cap has been removed.
Figure 5:
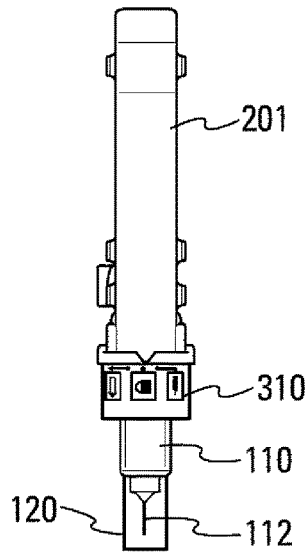
FIG. 5 is a view similar to the view in FIG. 4, shown after the needle-protecting cap has been removed.

The user may then remove the needle-protecting cap 130, as shown in FIGS. 4 and 5. Optionally, when the design of the reservoir 100 does not include a needle, the needle sub-assembly may initially be put into place on the reservoir module, preferably after putting said reservoir module 100 into place on the interface module 300.

Figure 6:
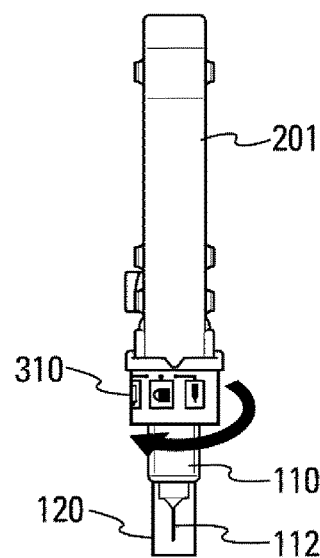
FIG. 6 is a view similar to the view in FIG. 5, shown after the interface module has been unlocked.
Figure 7:
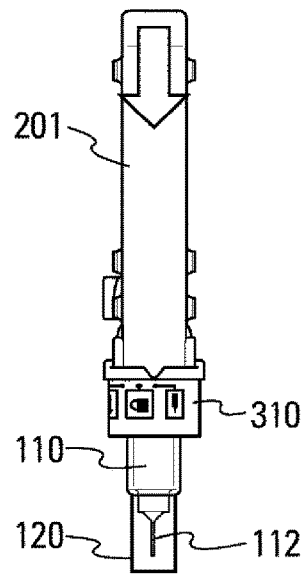
FIG. 7 is a view similar to the view in FIG. 6, shown at the beginning of actuation, before jabbing by the needle.
Figure 8:
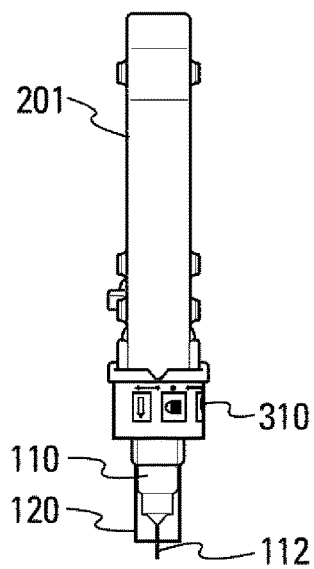
FIG. 8 is a view similar to the view in FIG. 7, shown during actuation, after jabbing by the needle, and before injection.
Figure 9:
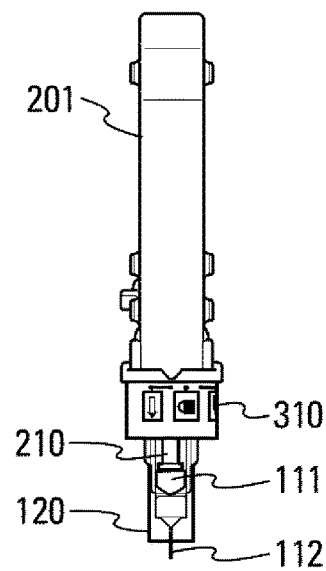
FIG. 9 is a view similar to the view in FIG. 8, shown after injection and before removal from the injection site.
Figure 10:
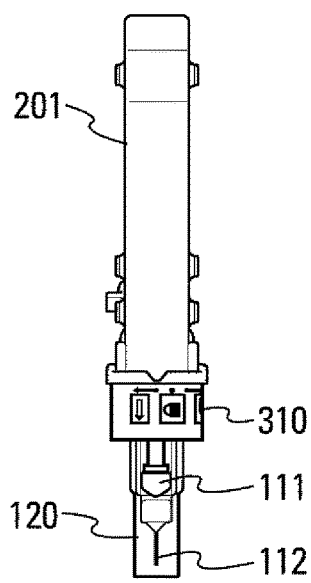
FIG. 10 is a view similar to the view in FIG. 9, shown after removal from the injection site and before the driver module has been re-cocked.
Figure 11:
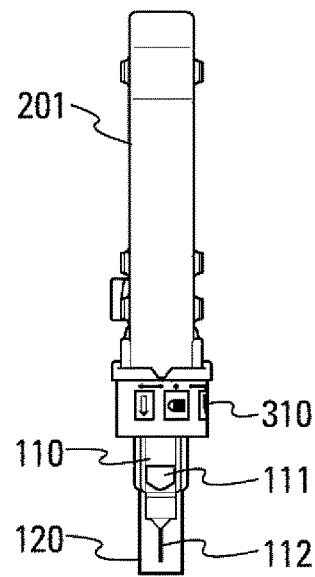
FIG. 11 is a view similar to the view in FIG. 10, shown after the driver module has been re-cocked and before the reservoir module has been unlocked.
Figure 12:
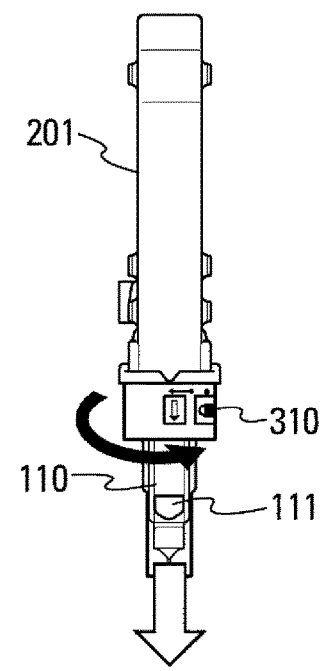
FIG. 12 is a view similar to the view in FIG. 11, shown after the reservoir module has been unlocked.

The selector ring 310 may then be unlocked towards an injection position, advantageously by being turned by the user, as shown in FIG. 6.

Figure 13:
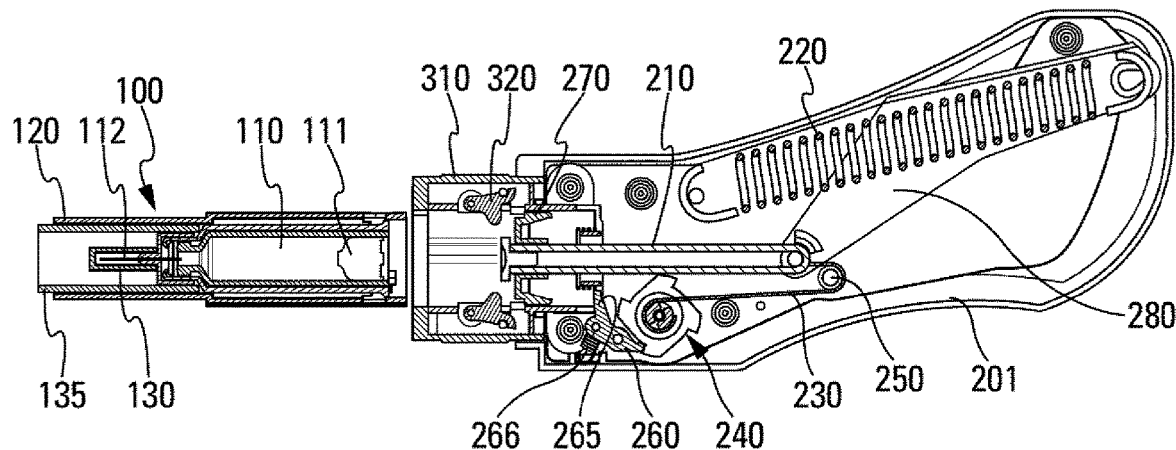
FIG. 13 is a diagrammatic section view of an autoinjector in an advantageous embodiment, shown before the reservoir module has been put into place.
Figure 14:
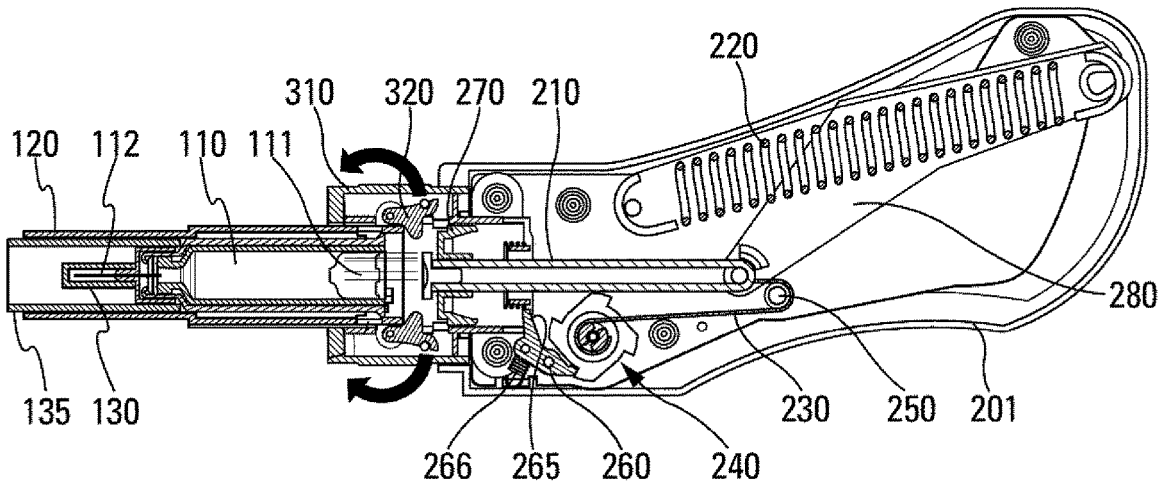
FIG. 14 is a view similar to the view in FIG. 13, shown at the beginning of the reservoir module being put into place.
Figure 15:
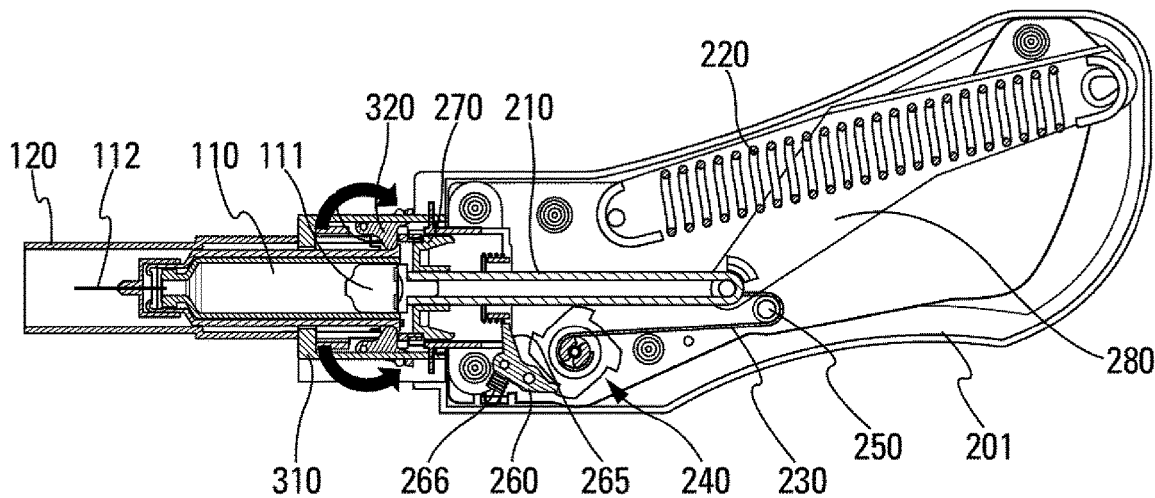
FIG. 15 is a view similar to the view in FIG. 14, shown once the reservoir module has been put into place.
Figure 16:
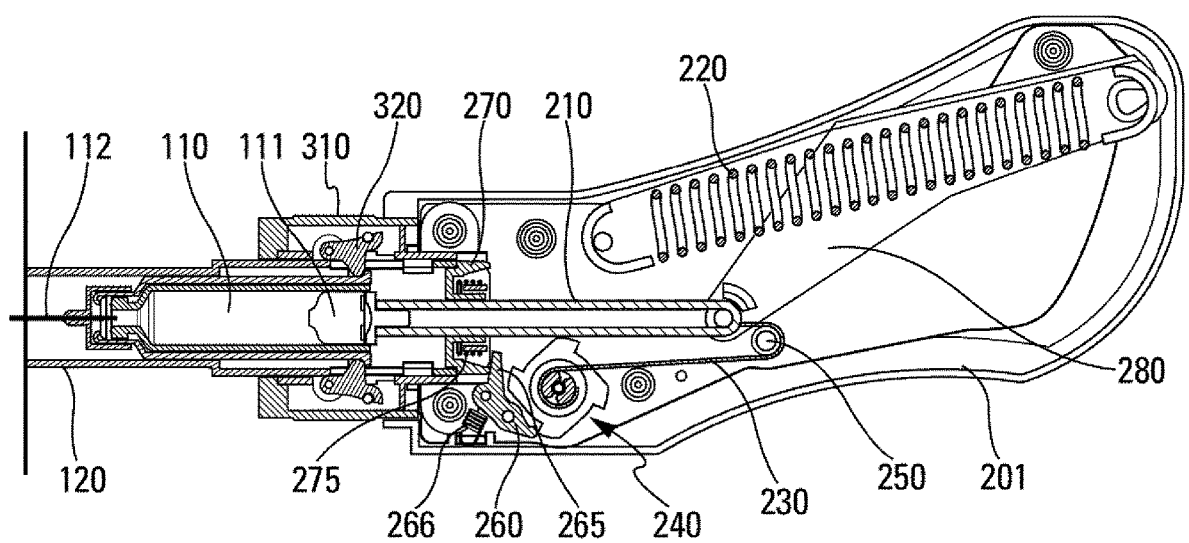
FIG. 16 is a view similar to the view in FIG. 15, shown during actuation, after jabbing by the needle, and before injection.

FIGS. 13 to 15 show the reservoir module 100 being put into place on the interface module 300. The pivot elements 320 of the interface module 300 advantageously enable the reservoir module 100 to be locked on the interface module 300.

FIGS. 7 to 10 show jabbing and injection in the embodiment shown.

At the beginning of actuation, the user presses the autoinjector against the site that is to be injected, thereby causing the actuator sleeve 120 to slide axially in the reservoir module 100, and thereby causing the needle 112 to jab into the injection site. Advantageously, the user must press with a force that is greater than a predeterminable threshold formed by a hard point that is provided so as to prevent any accidental sliding of said actuator sleeve 120.

During the jabbing stage, the selector ring 310 turns automatically towards a safety position indicating that the reservoir module 100 will be put into its needle safety position after injection during the deployment of the actuator sleeve 120.

At the end of jabbing, the actuator sleeve 120 co-operates with the lock of the driver module so as to trigger the injection stage, and the fluid contained in the reservoir 110 is expelled by the piston 111 that is thrust by the piston rod 210 being driven by force from an actuator spring 220.

When injection has ended, the user relaxes the pressure of the autoinjector against the skin and the actuator sleeve 120 deploys and becomes locked in its safety position.

The user can then re-cock the driver module 200, as described in greater detail below.

In order to eject the empty reservoir module 100, the user turns the selector ring 310 into its "ejection" position, and the reservoir module 110 is unlocked and moved axially in translation through a few millimeters. The user then finishes removing the used reservoir module 100 manually.

When it is released, the selector ring 310 returns automatically into its initial locked position, and it can then no longer be moved until a new full reservoir module 100 has been put into place in the interface module 300.

Figure 17:
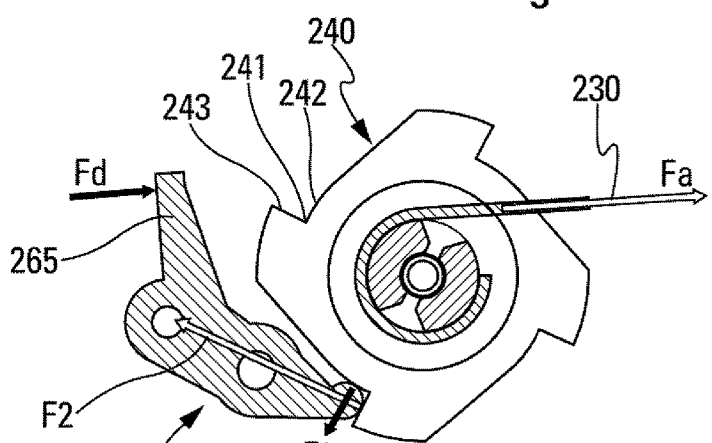
FIG. 17 is a diagrammatic section view of a detail of an injection lock in an advantageous embodiment, shown in its locked position.
Figure 18:
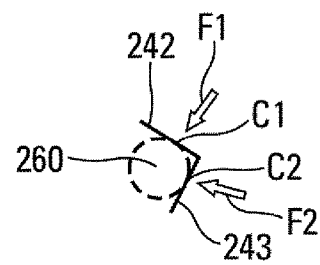
FIG. 18 is diagrammatic view of a detail of the FIG. 17 lock.
Figure 19:
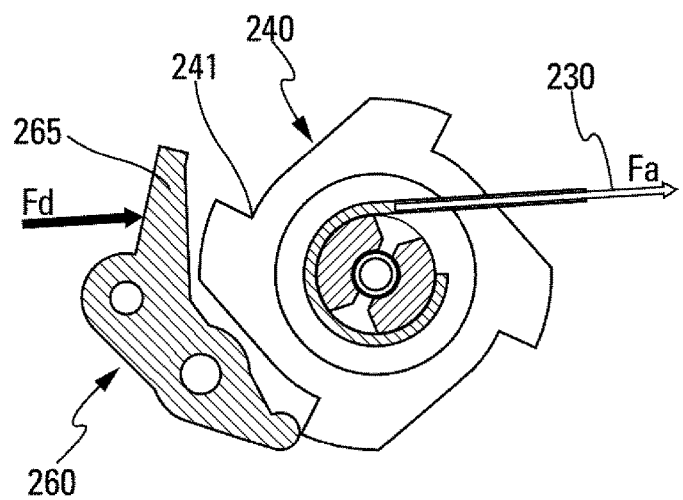
FIG. 19 is a view similar to the view in FIG. 17, shown in its unlocked position.
Figure 20:
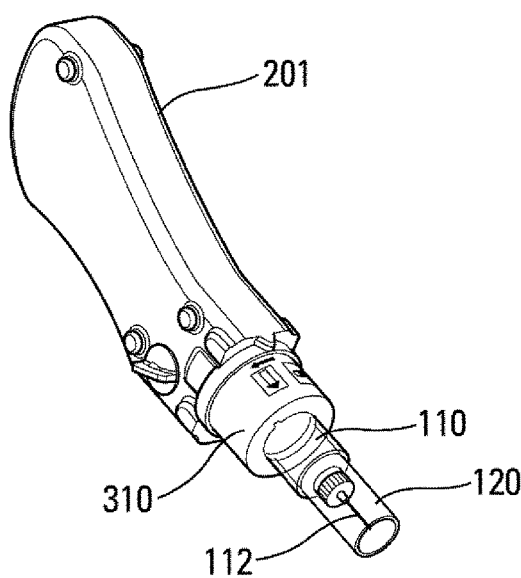
FIG. 20 is a diagrammatic side view in perspective of an autoinjector in an advantageous embodiment, shown after injection.
Figure 21:
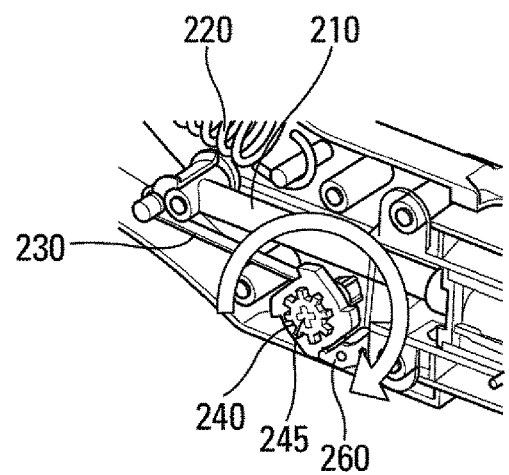
FIG. 21 is a diagrammatic and partially cut-away perspective view showing re-cocking means for re-cocking the FIG. 20 autoinjector.

FIGS. 17 to 19 show the injection lock more particularly.

In this embodiment, the piston rod 210 is connected via a belt, a wire, or thread 230 (or the like) to a toothed winder wheel 240, advantageously via a deflector wheel 250 forming a pulley. The injection spring 220 exerts an actuation force Fa on the piston rod 210, which actuation force is transmitted to the winder wheel 240 via said thread 230.

A locking member 260 co-operates with the teeth 241 of said toothed winder wheel 240, said locking member 260 being movable, in particular being pivotable, between a blocking position shown in FIG. 17, and an actuated position shown in FIG. 19.

Advantageously, a resilient element 266, e.g. a spring, urges said locking member 260 towards its blocking position.

Advantageously, in its blocking position, the locking member 260 co-operates with a tooth 241 of the winder wheel 240 with two contact points C1 and C2 that are arranged on two non-parallel surfaces 242 and 243, as can be seen in FIG. 18. This thus generates two forces F1 and F2 in different directions.

The locking member 260 includes an extension 265 that is adapted to co-operate with the actuator sleeve 120 when said actuator sleeve reaches its actuated position, i.e. once the needle 112 has jabbed into the injection site. Preferably, an intermediate ring 270 is provided between the actuator sleeve 120 and the locking member 260. Thus, after jabbing, the actuator sleeve 120 pushes against said intermediate ring 270 with an unlocking force Fd, and said intermediate ring 270 transmits the force Fd to said extension 265 of the locking member 260, thereby causing said locking member to pivot towards its actuated position. The winder wheel 240 is then no longer prevented from turning, and the injection spring 220 can move the piston rod 210 so to as to perform the injection stage.

During the injection stage, the thread 230 thus unwinds from said winder wheel 240.

During injection, the intermediate ring 270 is advantageously urged resiliently into contact with the actuator sleeve 120, e.g. by a spring 275, so that the actuator sleeve 120 is urged towards its safety position after injection.

This locking configuration serves to determine the force required from the user in order to unlock the lock and thus trigger injection. In particular, it serves to guarantee that a small force from the user unlocks a large injection force.

For example, an unlocking force Fd of 5 newtons (N) may be sufficient to unlock an injection spring 220 that is capable of exerting an actuation force Fa of about 100 N on the piston rod 210.

Furthermore, the lock forms an "engaging" system, i.e. the directions of the forces makes it possible to have a self-blocking system. Thus, an increase in the actuation force Fa strengthens the locking of the lock.

The device advantageously includes force control means for causing the force exerted by the injection spring 220 on the piston 111 of the reservoir 110 to vary in predetermined manner throughout the injection stage.

To do this, provision is made to use a lever 280 that may be connected to the piston rod 210, to the injection spring 220, and to a cam 290 that is preferably secured to the body 201 of the driver module 200.

In a variant, it is possible to envisage that the cam is formed on the lever and that it co-operates with a stationary point that is secured to the body.

The injection spring 220 may thus be fastened at one end to the body 201 and at its other end to said lever 280, which has one end that pivots on the piston rod 210 and has its other end that moves along said cam 290.

During injection, the lever 280 thus advantageously performs both a pivoting movement about a point of the piston rod 210 and also a movement in translation relative to the body 201, these two movements being linked and performed in a single plane.

As a function of the profile of said cam 290, it is possible to determine the actuation force Fa that is applied by the injection spring 220 on the piston rod 210 throughout the injection stage.

Figure 29:
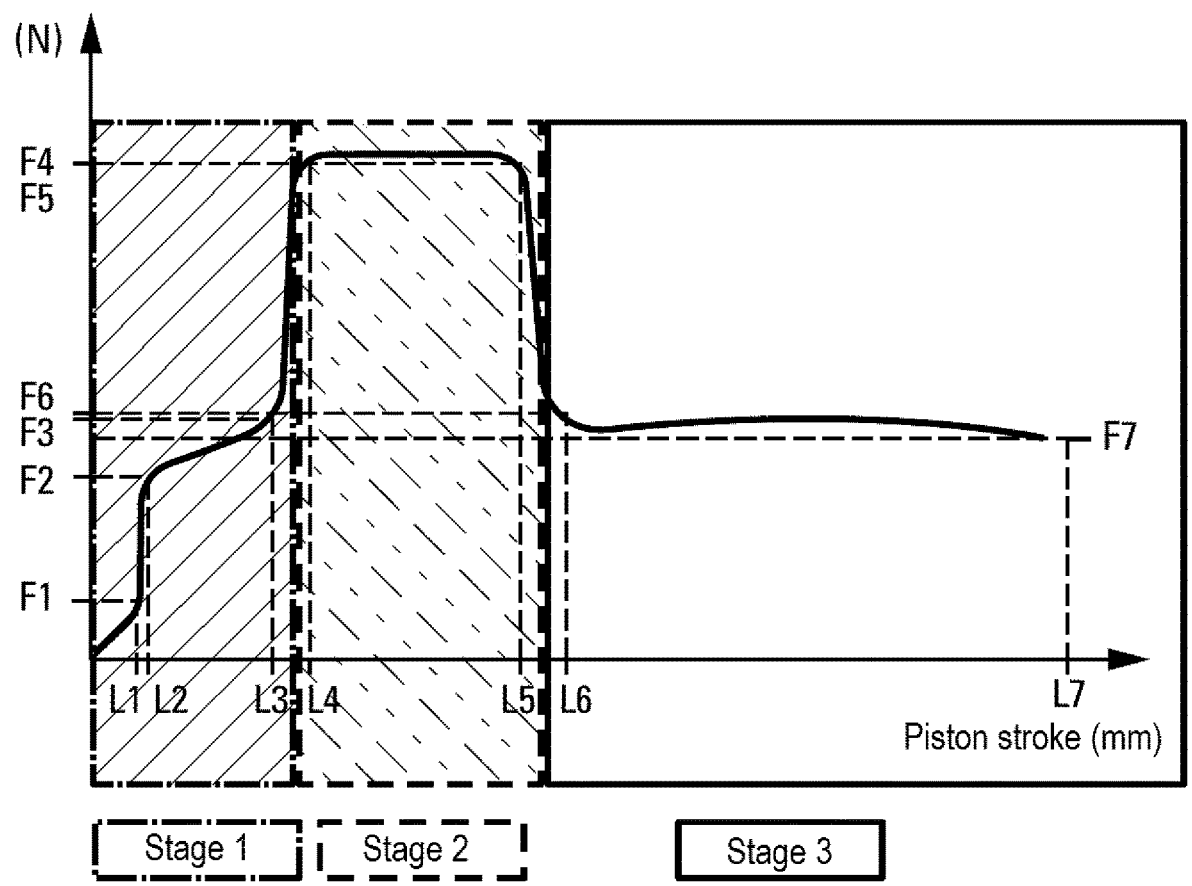
FIG. 29 plots a curve showing force during the various stages of injection, in an advantageous embodiment.

FIG. 29 is a graph plotting the force Fa in the example of the cam shown in FIGS. 25 to 28.

In this example, there are three distinct stages:
Stage 1: piston docking and compression
Stroke: 4 millimeters (mm)
   Docking (section before L1):
   Stroke: 2 mm
   Force Fa: increasing from 0 N to 18 N
   Compress stopper (section L2-L3):
   Stroke: 2 mm
   Force Fa: increasing from 57 N to 72 N
Stage 2: setting the fluid into motion (section L4-L5):
Stroke: 6 mm
Force Fa: constant 150 N
Stage 3: injecting the fluid (section after L6):
Stroke: 12 mm
Force Fa: constant 60 N Naturally, the numerical values are not limiting, and represent only one particular example.

Each section corresponds to a specific shape of the cam 290, and it is thus possible to predetermine any force profile by means of the cam 290.

In another variant, and by way of example, a constant actuation force Fa can be provided throughout the duration of the injection.

Advantageously, after injection, and preferably before ejection of the empty reservoir module 100, the user re-cocks the driver module 200 ready for subsequent use with another reservoir module 100.

To do this, in the example in FIGS. 13 to 22, the user rewinds the belt or the thread 230 around the winder wheel 240. This returns the piston rod 210 towards its start position, before actuation, and re-cocks the injection spring 220. The user thus turns the winder wheel 240 in the opposite direction relative to its direction in the injection stage. To do this, the winder wheel 240 includes a plurality of teeth 241 that co-operate with the locking member 260 like a non-return ratchet. When the user turns the winder wheel 240 in order to rewind the thread 230, the locking member 260 retracts and locks after each tooth 241 has passed. Thus, a higher number of teeth 241 makes it easier for the user to re-cock the driver module 200

Figure 22:
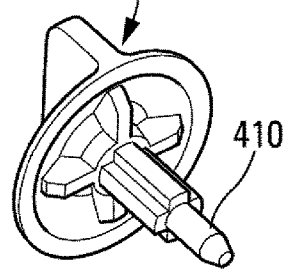
FIG. 22 is a diagrammatic perspective view of a re-cocking member that can be used with the FIG. 21 re-cocking means.

Advantageously, a re-cocking knob 400 is provided, an example of which is shown in FIG. 22. By way of example, the knob 400 may co-operate with the winder wheel 240 by means of splines 410 that match corresponding grooves 245 in the winder wheel 240. In a variant, a re-cocking shape could be formed directly on the winder wheel 240, replacing the knob. The knob 400 could also be replaced by a handle including a set of teeth that are adapted to co-operate with the winder wheel 240.

Optionally, it is possible to provide a set of cogs (not shown) so as to decrease the winding force and thus make winding easier for the user. It is then possible to provide a floating cog that co-operates firstly with the knob 400 and secondly with a set of teeth of the winder wheel 240, said floating cog being movable in an oblong hole of the body. This enables the floating cog to drive the winder wheel 240 only when it turns in one direction, without hindering the injection stage when the winder wheel 240 turns in the other direction.

Figure 23:
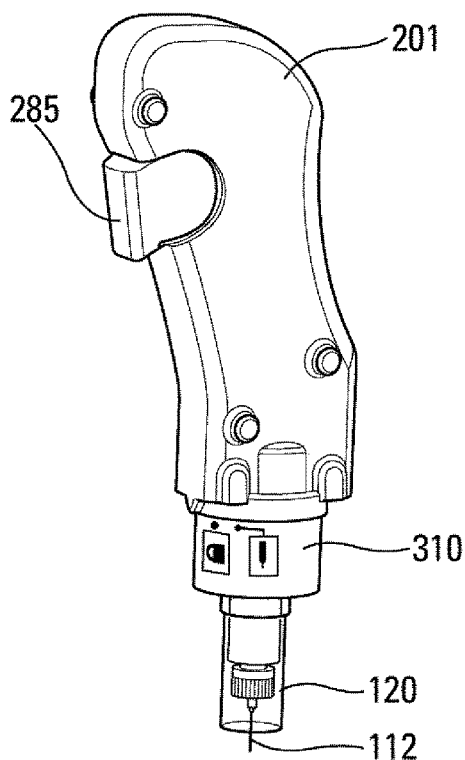
FIG. 23 is a diagrammatic side view in perspective of an autoinjector in another advantageous embodiment, shown after jabbing.
Figure 24:
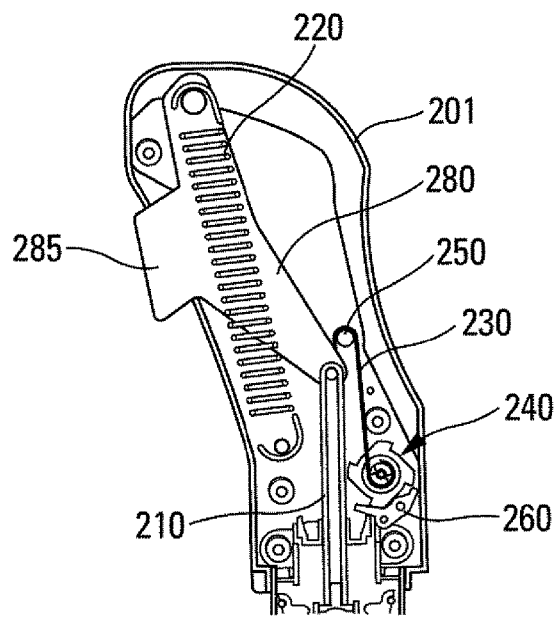
FIG. 24 is a diagrammatic and partially cut-away view of the FIG. 23 device.
Figure 25:
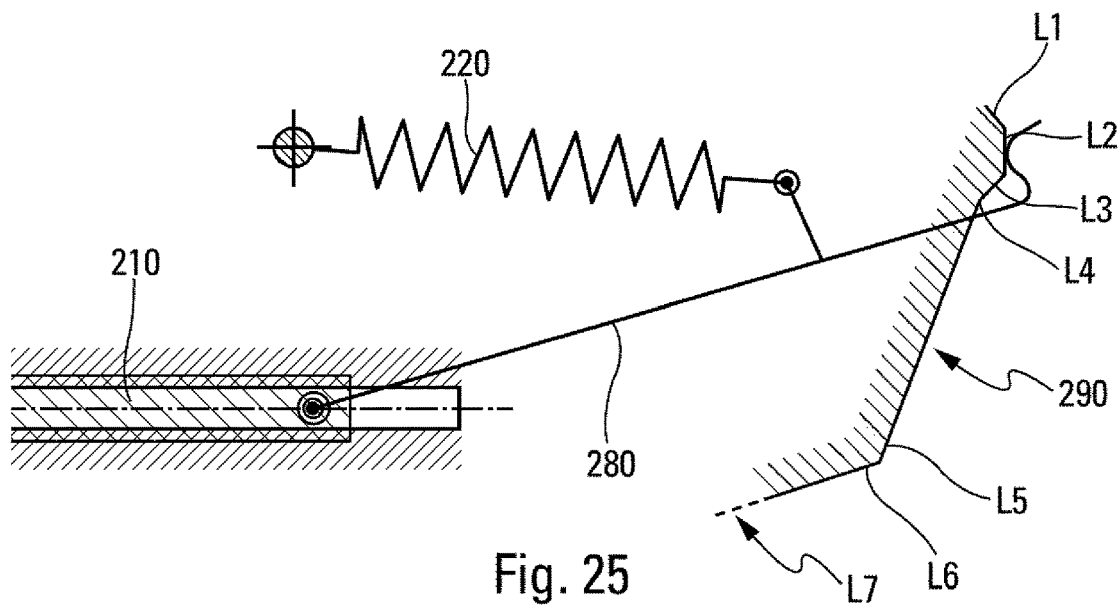
FIG. 25 is a diagram in section showing an advantageous example of a cam that makes it possible to predetermine the force profile during the injection stage.
Figure 26:
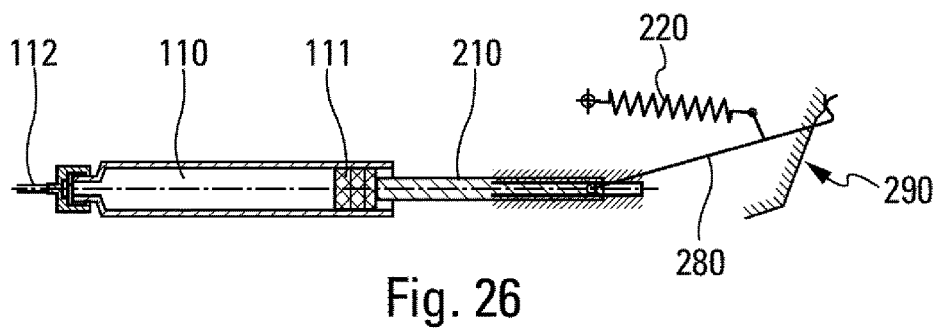
FIGS. 26 to 28 are views similar to the view in FIG. 25, showing the device successively at the beginning of injection and during injection.
Figure 27:
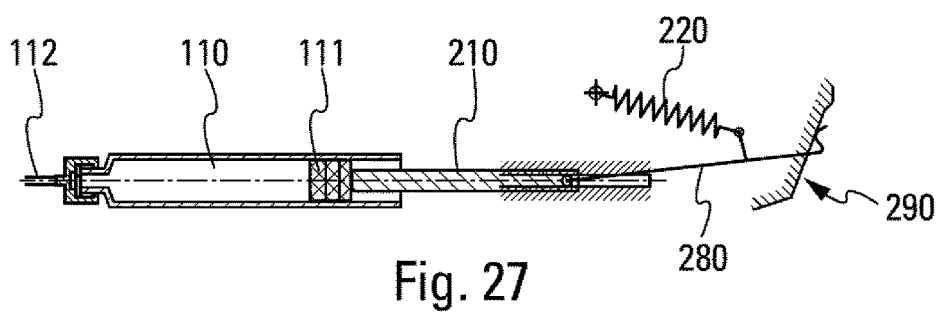
Figure 28:
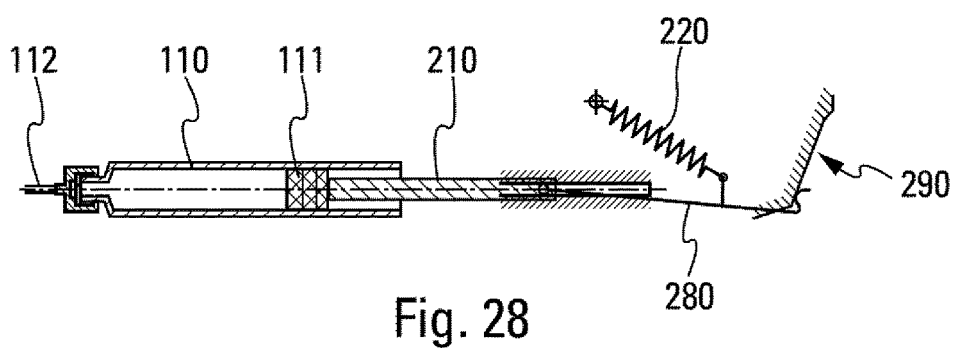

In the embodiment in FIGS. 23 and 24, provision is made to enable the user to act directly on the injection force, i.e.

to manually increase the injection force. This can occur by pressing directly on the lever 280 via a portion 285 of said lever that projects out from the body 201 of the driver module 200. In a variant, it is possible to provide a connection piece that is accessible from the outside of the body 201 and that makes it possible to act on the lever 280.

The present invention applies to devices used in particular for treatment of auto-immune diseases, e.g. of the rheumatoid arthritis, multiple scleroses, Crohn's disease type, for treatment of cancer, for antiviral treatments, e.g. of the hepatitis type, for treatment of diabetes, for treatment of anemia, or for treatment of allergy attacks, e.g. in the event of anaphylactic shock.

Although the present invention is described above with reference to advantageous embodiments, naturally various modifications are possible for the person skilled in the art, without going beyond the ambit of the present invention, as defined by the accompanying claims.

The invention claimed is:

1. An autoinjector, comprising:
    a reservoir module (100) comprising a reservoir (110) containing a fluid and a piston (111), and including a needle (112); and
    a driver module (200) comprising:
        a body (201);
        a piston rod (210) that is adapted to co-operate with the piston (111) of said reservoir (110), said piston rod (210) being movable between a rest position and an injection position in which said piston rod (210) has moved the piston (111) of the reservoir (110) so as to inject the fluid through said needle (112);
        an injection spring (220) for urging said piston rod (210) towards the injection position; and
        a lock that blocks said piston rod (210) in the rest position, said lock comprising a thread (230) that is connected at one end to said piston rod (210) and at an other end to a toothed winder wheel (240), a locking member (260) co-operating with a tooth (241) of said toothed winder wheel (240), said locking member (260) being movable, in particular pivotable, between a blocking position in which it prevents the winder wheel (240) from turning in a direction of an actuation force (Fa) exerted by said injection spring (220) on said piston rod (210), and an actuated position in which said turning of the winder wheel (240) is possible;
    said autoinjector further comprising a re-cocking knob (400) for rewinding said thread (230) on said winder wheel (240) by turning said winder wheel (240) in an opposite direction to the direction during an injection stage;
    wherein said locking member (260) includes an extension (265) that is adapted to co-operate with an actuator sleeve (120) of the reservoir module (100) when said needle (112) has jabbed a site that is to be injected, so as to move said locking member towards the actuated position.

2. The autoinjector according to claim 1, wherein said reservoir module (100) further comprises the actuator sleeve (120) that is movable relative to said reservoir (110) between a deployed position in which it is arranged around said needle (112), and the actuated position in which it is moved axially relative to the reservoir (110) so as to expose the needle (112).

3. The autoinjector according to claim 1, further comprising an interface module (300) that is fastened to the driver module (200) and that receives the reservoir module (100) before each actuation.

4. The autoinjector according to claim 3, wherein said interface module (300) comprises a selector ring (310) that is mounted to turn on the driver module (200), and pivot elements (320) for fastening the reservoir module (100) in the interface module (300).

5. The autoinjector according to claim 4, wherein said selector ring (310) is movable in turning between a locked position in which insertion of the reservoir module (100) is possible and the actuation of the driver module (200) is not possible, an injection position in which the actuation of the driver module (200) is possible, a safety position in which the actuator sleeve (120) of the reservoir module (100) returns into a deployed position around said needle (112), and an ejection position in which an ejection of the used reservoir module is possible.

6. The autoinjector according to claim 1, wherein said driver module (200) includes a force control means (280, 290), for causing the actuation force (Fa) exerted by said injection spring (220) on said piston rod (210) to vary in a predetermined manner throughout the injection stage, said force control means comprising a lever (280) and a cam (290), said lever (280) being pivotally mounted at one end on said piston rod (210), being connected to said injection spring (220), and co-operating at its other end with said cam (290).

7. The autoinjector according to claim 1, wherein a deflector wheel (250) forming a pulley for the thread (230) is provided between said piston rod (210) and said winder wheel (240).

\* \* \* \* \*